United States Patent [19]
Akiyama et al.

[11] 3,928,286
[45] Dec. 23, 1975

[54] HEAT-RESISTANT ADHESIVE COMPOSITION FROM A BIS-MALEIMIDE, AN ALPHA-CYANOACRYLATE AND OPTIONALLY A DIAMINE

[75] Inventors: Keiiti Akiyama, Yokosuka; Shyuichi Suzuki; Yukihiro Mikogami, both of Yokohama, all of Japan

[73] Assignee: Tokyo Shibaura Electric Co., Ltd., Kawasaki, Japan

[22] Filed: Apr. 1, 1974

[21] Appl. No.: 456,609

[30] Foreign Application Priority Data
Apr. 24, 1973 Japan.................. 48-45717
Aug. 6, 1973 Japan.................. 48-87620
Sept. 27, 1973 Japan.................. 48-107993

[52] U.S. Cl. ... 260/47 UA; 260/30.4 R; 260/31.4 R; 260/32.8 N; 260/47 CZ; 260/63 N; 260/65; 260/78 UA; 428/474

[51] Int. Cl.$^2$........................... C08G 69/26
[58] Field of Search....... 260/78 UA, 47 CZ, 47 UA

[56] References Cited
UNITED STATES PATENTS
3,742,089  6/1973  Schroeter...................... 260/78 UA
3,761,430  9/1973  Witzel........................... 260/78 UA

*Primary Examiner*—Harold D. Anderson
*Attorney, Agent, or Firm*—Kemon, Palmer & Estabrook

[57] ABSTRACT

A heat-resistant adhesive composition including 85 to 1 mol% of N,N'-substituted bismaleimide and 15 to 99 mol% of α-cyanoacrylate. Diamines or silane coupling agents may be incorporated.

7 Claims, 2 Drawing Figures

F I G. 1
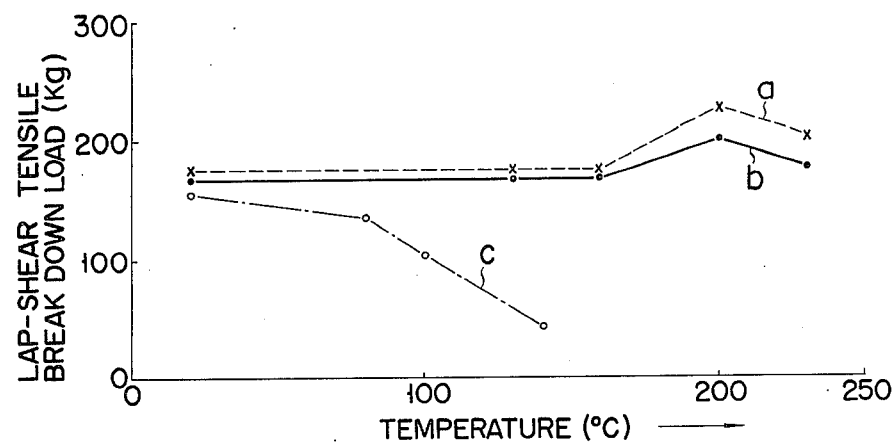
F I G. 2
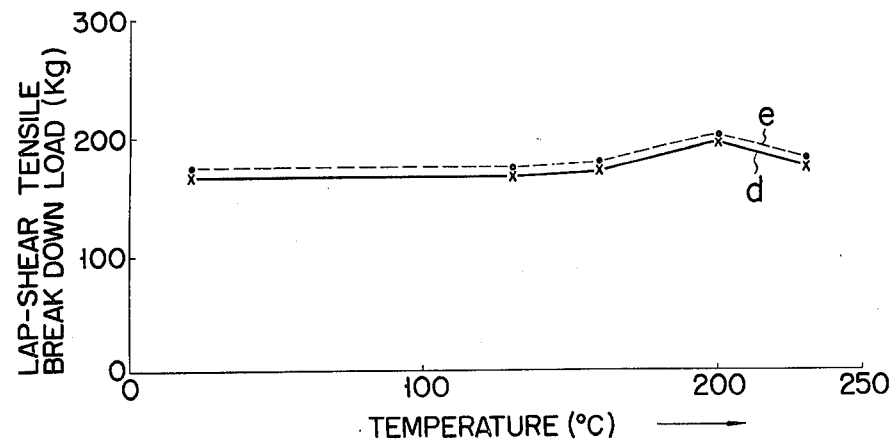

HEAT-RESISTANT ADHESIVE COMPOSITION FROM A BIS-MALEIMIDE, AN ALPHA-CYANOACRYLATE AND OPTIONALLY A DIAMINE

This invention relates to a heat-resistant adhesive composition and more particularly to the composition including N,N'-substituted bismaleimide and α-cyanoacrylate.

Synthetic resin adhesives based on phenolic resins, epoxy resins, nitrile resins, neoprenes, polyamides, or mixtures thereof are known. These adhesives are generally inferior in heat resisting properties and upon easy decomposition fall to function at a temperature above 150°C.

It is also known that polyimides or polybenzimidazoles are used as adhesives of good heat resisting properties. The use of these adhesives, however, is complex since dehydrated water produced during curing must be removed prior to usage. For example, when polyimide is used, it must be impregnated into a substrate such as glass cloth to form a prepreg in order to remove most of dehydrated water. Polyimide or polybenzimidazole adhesives have therefore a limit field of application.

α-cyanoacrylate homopolymer is known to be a good instantaneous adhesive, but is used only at temperatures below 100°C at most. In addition, it forms an adhesive layer which, when cured, is less resistive against impacts, so that the field of application is limited.

A film formed, for example, of polyimide, polyhydantoin or polyparabanic acid is greatly heat resistive and is conveniently used in the manufacture of printed circuit elements such as metal-clad flexible films by being placed on a flexible metal substrate. The excellent heat resisting property of the film, however, can not be fully utilized when the known adhesive of poor heat resistance is used. The use of such adhesive further makes it necessary that the heat resistant film be surface treated either mechanically or chemically to improve its wettability.

It is an object of this invention to provide a heatresistant adhesive composition which has strong adhesivity at a temperature above 200°C and flexibility when cured, and is easy to handle.

According to this invention there is provided a heatresistant adhesive composition comprising:

85 to 1 mol% of at least one N,N'-substituted bismaleimide selected from the group consisting of the bismaleimides represented by the formula

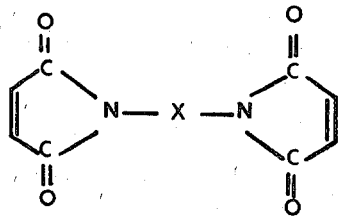

and those represented by the formula

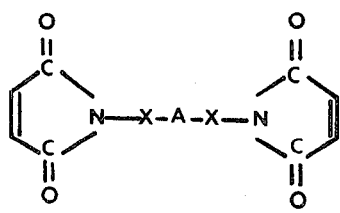

where X is a member selected from the group consisting of alkylene, cycloalkylene and arylene groups, and A is a member selected from the group consisting of oxygen and methylene, carbonyl, sulfonyl and amide (—CONH—) groups; and 15 to 99 mol% of at least one α-cyanoacrylate represented by the formula

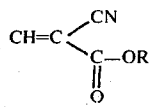

where R is a member selected from the group consisting of $C_1$ to $C_6$ alkyl groups and cyclohexyl group.

This invention can be more fully understood from the following detailed description when taken in conjunction with the accompanying drawing, in which:

FIGS. 1 and 2 show relations between lap-shear tensile break down load and temperature with respect to the composition of the invention.

The heat-resistant adhesive composition according to the invention contains 85 to 1 mol% of N,N'-substituted bismaleimide. The bismaleimide is selected from those represented by the formula

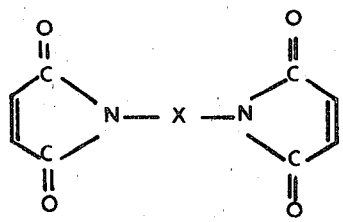

and those represented by the formula

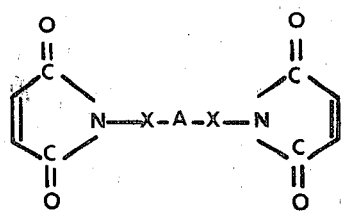

where X is an alkylene, cycloalkylene or arylene group, and A is oxygen or methylene, carbonyl, sulfonyl or amide (—CONH—) group.

Examples of N,N'-substituted bismaleimide include N,N'-hexamethylene bismaleimide, N,N'-p-phenylene bismaleimide, N,N'-methylene-di-p-phenylene bismaleimide, N,N'-oxy-di-p-phenylene bismaleimide, N,N'-4,4'-benzophenone bismaleimide and N,N'-p-diphenylsulfone bismaleimide. Two or more of these bismaleimides may be used together in the composition.

The content of N,N'-substituted bismaleimide should be within the range of 85 to 1 mol%. If the content is more than 85 mol% a resultant composition, when cured, will be hard and less flexible and hence less durable against impact. The content less than 1 mol% will lower the required heat-resistivity of the composition. It has been found that the content of the bismaleimide should preferably range from 85 to 25 mole%.

Part of the bismaleimide may be substituted with N-substituted maleimide such as maleimide, N-phenyl maleimide, N-hydroxyethyl maleimide, N-ethyl maleimide and N-(4-methoxy)-phenyl maleimide.

The composition of the invention further contains 15 to 99 mol% of α-cyanoacrylate represented by the formula

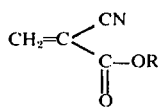

where R is a hydrocarbon group selected from $C_1$ to $C_6$ alkyl groups and a cyclohexyl group.

Examples of the acrylate are methyl α-cyanoacrylate, ethyl α-cyanoacrylate, n-propyl α-cyanoacrylate, isopropyl α-cyanoacrylate, n-butyl α-cyanoacrylate, isobutyl α-cyanoacrylate and isopentyl α-cyanoacrylate, among which ethyl α-cyanoacrylate is most preferred. Two or more of the acrylates may be added together to the composition.

For the reasons set forth above, the content of α-cyanoacrylate is 15 to 99 mol%, with 15 to 75 mol% being most preferable.

In order to activate the curing or resinifying reaction of the composition, the composition may further contain tertiary amines such as triethylamine, benzyldimethylamine, triethanolamine, N,N-dimethylaniline, pyridine and quinoline, or peroxides such as dicumyl peroxide, tert-butyl cumyl peroxide, methyl ethyl ketone peroxide, di-tert-butyl peroxide and 2,5-dimethyl-2,5-di-tert-butyl peroxy hexyne-3.

The heat-resistant adhesive composition according to the invention may be used with or without being diluted with a solvent having a relatively low boiling point, such as acetone, methyl ethyl ketone, dioxane, tetrahydrofuran, 1,2-dimethoxy ethane and 2-methoxyacetic acid esters. When the composition is diluted it should preferably be heated prior to application to remove the solvent and, thereby to assist the two major components of the composition to prepolymerize.

It has been found that if diamine is added to the diluted composition, the prepolymer formed by heating the diluted composition is more soluble in the solvent used to dilute the composition. As a result the composition can be handled very easily.

The diamine is selected from those represented by the formula

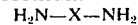

and those represented by the formula

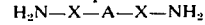

where X is an alkylene, cycloalkylene or arylene group, and A is oxygen or a methylene, carbonyl, sulfonyl or amide (—CONH—) group. Examples of the diamine are 4,4'-diaminodiphenylmethane, 4,4'-diaminodiphenyl ether, 4,4'-diaminodiphenyl sulfone, benzidine, 4,4'-diaminodicyclohexylmethane, xylylene diamine, 1,4-diaminocyclohexane, hexamethylenediamine and 2,2-bis(4-aminophenyl) propane. Two or more of these diamines may be added to the composition.

The diamine is added in an amount corresponding to 0.7 to 0.02 equivalent of diamine for one of the double bonds which are contained in the N,N'-substituted bismaleimidecyanoacrylate system and attribute to the curing reaction of the system. Such double bonds will be hereinafter referred to as "active double bonds". More than 0.7 equivalent of the diamine will result in decrease in adhesive strength of a resultant composition while less than 0.02 equivalent of the diamine will produce no effect of its addition.

The heat-resistant adhesive composition according to the invention is readily cured, thereby exhibiting a strong adhesive strength. Once the composition has been cured, the adhesive strength does little decrease even after it is heated at a temperature of more than 200°C for a long period of time. Further, a cured layer of the composition has high flexibility and is suffered nothing from being bent double.

It is very surprising for the composition of the invention to have such characteristics as mentioned above in view of the facts that N,N'-substituted bismaleimide itself, when cured or resinified, becomes very hard and brittle, not acting as an adhesive, and that α-cyanoacrylate itself, although having good adhesivity, is poor in heat resistance and after heated at 100° to 160°C its adhesive strength becomes almost nil.

The adhesive composition of the invention is suitable as an adhesive for adhering metals such as copper and iron, glasses, ceramics and heat-resistant films such as polyimide films, and for heat-resistant resin laminates, metal-clad flexible dielectric films and flexible heaters. Particularly when the composition is used for adhering organic polymeric material to inorganic material, a silane coupling agent such as γ-aminopropyl triethoxy silane, vinyltriethoxysilane, γ-glycidoxypropyltriethoxysilane, γ-methacryloxypropyl triethoxy silane and N-{3-(triethoxysilyl)-propyl} maleic acid amide may be added in a required amount to further increase the adhesive strength of the composition.

This invention will be further described with reference to the following examples.

Example 1

Into a separable flask equipped with a stirrer and a thermometer, 85 mol% of N,N'-methylene-di-p-phenylene bismaleimide and its 25 times weight of tetrahydrofuran were charged and well stirred. To the obtained solution was gradually added a solution formed by dissolving 15 mol% of ethyl α-cyanoacrylate into its 15 times weight of tetrahydrofuran to obtain an adhesive composition solution (Sample 1). Likewise, other adhesive composition solutions (Samples 2 to 7) having the bismaleimide and the acrylate in mol% indicated in Table 1 were prepared.

A. These solutions were heated to 50°C and stirred for an hour to prepolymerize the two components. The solvent was removed to obtain 15 wt.% prepolymer solutions.

Each prepolymer solution was coated on both surfaces of a Kapton film of a thickness of 0.075 mm (trade name for polyimide film manufactured by E. I. Du Pont de Nemours & Co.) and was dried by air for 30 minutes. Then, an adhesive was deposited on the Kapton film at the rate of 28 to 30g/m². The film was further dried by heating at 175 to 200°C for 2 to 3 minutes to obtain a transparent adhesive-coated film.

Each of the adhesive-coated films were cut into pieces of a width of 15 mm and a length of 20 mm, which were then placed between two iron plates 1.5 mm thick; 15 mm wide and 150 mm long and heated at 200°C for 8 hours under a pressure of 3 kg/cm² thereby to obtain totally ten test pieces in respect to each adhesive-coated film.

Lap-shear tensile break down load was measured for the ten test pieces of iron plates and each adhesive-coated film bonded together at a crosshead speed of 2.5 mm/min, five pieces at room temperature and the remaining five at a temperature of 200°C. The average measured values are shown in Table 1.

Further, Sample 5 was coated on one surface of degreased iron, copper and aluminum plates each having a thickness of 1.5 mm, a width of 15 mm and a length of 150 mm. After air-dried, these plates were heat-treated at 180°C for 3 to 5 minutes. Two metal plates of the same kind were heated at 200°C for 8 hours under a pressure of 3 kg/cm$^2$ and so adhered to have an overlapping portion 20 mm in their lengthwise direction. Thus prepared were five test pieces for each test. Lap-shear tensile break down load (kg) was measured at room temperature and at 200°C with a crosshead speed of 2.5 mm/min.

Results are shown in Table 3, in which data is of the average value.

Table 1

| Component \ Sample No. | | 1 | 2 | 3 | 4 | 5 | 6 | 7 |
|---|---|---|---|---|---|---|---|---|
| N,N'-methylene-di-p-phenylene bismaleimide | | 85 | 70 | 50 | 30 | 25 | 5 | 1 |
| Ethyl α-cyanoacrylate | | 15 | 30 | 50 | 70 | 75 | 95 | 99 |
| Lap-shear tensile break down load (kg) | Room temp. | 191 | 176 | 180 | 172 | 175 | 165 | 154 |
| | 200°C | 222 | 226 | 219 | 215 | 226 | 128 | 65 |

Further, five test pieces of each of Samples 2 and 5 were prepared as described above. For comparison test, pieces were also prepared by using ethyl α-cyanoacrylate alone under the same condition. Lap-shear tensile break down load was measured at various temperatures with a crosshead speed of 2.5 mm/min. Results are indicated in FIG. 1, in which curves (a), (b) and (c) are cases where Samples 2 and 5 and ethyl α-cyanoacrylate were used, respectively.

Furthermore, lap-shear tensile break down load was measured for each fifteen pieces obtained by using prepolymer solutions of Samples 3, 4 and 5 after the pieces were allowed to stand at a fixed temperature indicated in Table 2 below for 1000 hours. Crosshead speed was 2.5 mm/min. Table 2 shows the percentage of the average of measured values against the value at room temperature in Table 1.

Table 2

| Temp. \ Sample No. | 3 | 4 | 5 |
|---|---|---|---|
| 200°C | 100 | 98 | 102 |
| 225°C | 90 | 85 | 100 |
| 250°C | 72 | 68 | 85 |

B. Samples 4 and 5 were applied to one surface of Kapton films having a thickness of 0.075 mm, a width of 15 mm and a length of 150 mm. After air-dried the films were further dried at 200°C for 2 to 3 minutes to prepare transparent adhesive-coated films. Two films of the same kind were heated at 200°C for 8 hours under a pressure of 3 kg/cm$^2$ and so adhered to have an overlapping portion 20 mm in their lengthwise direction. Ten lap-shear tensile test pieces from each Sample were thus obtained.

All the pieces were broken at a portion other than the adhered when subjected lap-shear tensile test conducted at room temperature or at 200°C, with crosshead speed being 2.5 mm/min.

Table 3

| Metal Temp. | Iron-Iron | Copper-Copper | Aluminum-Aluminum |
|---|---|---|---|
| Room temp. | 170 | 151 | 160 |
| 200°C | 192 | 156 | 168 |

Furthermore, adhesive-coated Kapton films having a thickness of 0.075 mm, a width of 15 mm and a length of 150 mm were prepared as described above. To these films were adhered copper foils for printing substrate, having a thickness of 0.05 mm, a width of 15 mm and a length of 50 mm, by heating at 200°C for 10 hours under a pressure of 5 kg/cm$^2$ to obtain five peel test pieces.

These pieces exhibited strength of 600 to 900g/cm when subjected to peel test made at room temperature.

Example 2

Same procedure was repeated as in Example 1 (A) to obtain six prepolymer solutions, but the solvent for bismaleimides was a mixture of tetrahydrofuran and methyl ethyl ketone. Mol% of N,N'-substituted bismaleimide and α-cyanoacrylate used is indicated below in Table 4.

Table 4

| Component \ Sample No. | | 8 | 9 | 10 | 11 | 12 | 13 |
|---|---|---|---|---|---|---|---|
| N,N'-methylene-di-p-phenylene bismaleimide | | — | 12.5 | — | — | — | 10 |
| N,N'-oxy-di-p-phenylene bismaleimide | | 25 | 12.5 | 30 | — | 12.5 | 10 |
| N,N'-hexamethylene bismaleimide | | — | — | — | 30 | 12.5 | 10 |
| Methyl α-cyanoacrylate | | — | 25 | — | — | 5 | 5 |
| Ethyl α-cyanoacrylate | | 75 | 50 | — | 70 | — | 45 |
| Isopropyl α-cyanoacrylate | | — | — | 70 | — | 70 | 20 |
| Lap-shear tensile break down load (kg) | Room temp. | 170 | 182 | 190 | 156 | 170 | 175 |
| | 200°C | 195 | 203 | 195 | 85 | 130 | 170 |

A. Five test pieces were made from each Sample as in Example 1 (A). Lap-shear tensile break down load was measured at room temperature and at 200°C. Results obtained are shown above in Table 4, in which data is the average of five measured values.

B. Sample 8 was applied to a glass cloth 0.05 mm thick, and dried to obtain a prepreg having 40% by weight of the resin. The prepreg was then heated at 200°C for 2 to 3 minutes. From the prepreg were cut pieces having a width of 15 mm and a length of 20 mm. Ten test pieces were made under the same conditions as in Example 1 (A), using the prepreg pieces as adhering mediums. Lap-shear tensile breakdown load was measured of five test pieces at room temperature and of other five test pieces at 200°C, resulting in the averages of 158 kg and of 164 kg, respectively.

C. To 12 ml of Sample 12 was added as an accelerator 0.05g of benzyldimethylamine, N,N-dimethylaniline or quinoline. Gelation time (second) was measured at a fixed temperature. Results are indicated in Table 5.

Table 5

| Temperature (°C) Accelerator | 220 | 200 | 180 | 160 |
|---|---|---|---|---|
| Benzyldimethylamine | — | 10 | 15 | 24 |
| Dimethylaniline | 28 | 99 | 275 | — |
| Quinoline | 8 | — | 88 | 600 |
| Non | >1000 | >1000 | >1000 | >1000 |

Table 5 shows clearly that the addition of the accelerator shortens to a great extent the gelation time of the composition.

Example 3

A separable flask with a stirrer and a thermometer was charged with N,N'-methylene-di-p-phenylene bismaleimide and ethyl α-cyanoacrylate in the mol% indicated in Table 6, and dioxane was added. The mixture was stirred for about 1 hour, maintained at 70° to 80°C, to prepolymerize the two components. The solvent was removed to obtain a solution having a resin content of 30% by weight, to which dicumyl peroxide was added in an amount corresponding to 1% by weight of the resin content.

The solution thus obtained was coated on one surface of Kapton film. The solution coated film was air-dried for 30 minutes and heated at 110° to 120°C for about 10 minutes. An adhesive-coated film having 15 to 20 g/m$^2$ of the resin was thus prepared.

The adhesive-coated film was overlapped with an untreated electrically deposited copper foil 0.035 mm thick, and heated at 250°C for 10 minutes under a pressure of 3 to 10 kg/cm$^2$ to obtain a 300 mm × 300 mm copper-clad flexible film, from which test pieces of required size were cut out. A test was made according to Japanese Industrial Standard-C 6481 (Testing Method of Copper-Clad Laminates for Printed Circuits). Results obtained are shown in Table 6, in which chemical resistance is a resistance to acetone, trichloroethylene and toluene.

Table 6

| Component \ Sample No. | 14 | 15 | 16 | 17 | 18 |
|---|---|---|---|---|---|
| N,N'-methylene-di-p-phenylene bismaleimide | 85 | 70 | 50 | 30 | 25 |
| Ethyl α-cyanoacrylate | 15 | 30 | 50 | 70 | 75 |
| Solder dip resistance at 200°C (sec.) | Not affected >1800 | Not affected >1800 | Not affected >1800 | Not affected >1800 | Not affected >1800 |
| Peel strength (kg/cm) | Film broken | Film broken | Film broken | Film broken | Film broken |
| Surface resistivity (Ω) | >10$^{14}$ | >10$^{14}$ | >10$^{14}$ | >10$^{14}$ | >10$^{14}$ |
| Volume resistivity (Ωcm) | >10$^{17}$ | >10$^{17}$ | >10$^{17}$ | >10$^{17}$ | >10$^{17}$ |
| Dielectric strength (KV/mm) | >80 | >80 | >80 | >80 | >80 |
| Chemical resistance | Not affected | Not affected | Not affected | Not affected | Not affected |

Table 6 clearly reveals that all the Samples are satisfactory for flexible printing films.

Example 4

To a one-liter three-necked flask equipped with a stirrer and a thermometer, there were charged 484g of a mixed solvent of 40% by weight of methyl ethyl ketone, 40% by weight of tetrahydrofuran and 20% by weight of toluene; 21.5g (0.17 mole) of ethyl α-cyanoacrylate; 7.1g (0.035 mole) of 4,4'-diaminodiphenylmethane; and 179g (0.5 mole) of N,N'-methylene-di-p-phenylene bismaleimide. The mixture was stirred for 2 hours in a water bath while maintained at 70° to 75°C. A clear solution having 30 wt.% of the resin was obtained, to which dicumyl peroxide was added in an amount corresponding to 1% by weight of the resin.

The resultant resin solution was applied to one surface of a polyimide film 0.075 mm thick, a polyamide-imide film 0.025 mm thick, a polyparabanic acid film 0.05 mm thick and a polyhydantoin film 0.06 mm thick, respectively. After air-dried, these films were heated at 120°C for 10 minutes to obtain adhesive-coated films having 20 to 25g/m$^2$ of the resin on each of them.

Each of these films was adhered to a carbon paper CP-B-40 0.15 mm thick available from Kureha Kagaku Kogyo K.K. under a pressure of 5 to 7 kg/cm$^2$, at 250°C for 10 minutes for polyimide film, at 220°C for 40 minutes for polyamide-imide film and for polyhydantoin film, and at 200°C for 1 hour for polyparabanic acid film. Thus, heaters were made, and they presented good flexibility.

From these flexible heaters were cut out pieces having a width of 10 mm and a length of 110 mm, between whose lengthwise ends a voltage of 13.5V was applied. The temperature reached at 200° to 250°C, but no undesirable phenomenon was recognized in the heaters.

Example 5

To a solution obtained by mixing 26 mol% of N,N'-methylene-di-p-phenylene bismaleimide with its 25 times weight of tetrahydrofuran-methyl ethyl ketone system, was added a solution prepared from 74 mol% of ethyl α-cyanoacrylate and its 15 times weight of tetrahydrofuran to form an adhesive solution, and then benzyldimethylamine was added. The obtained solution was heated at 40° to 50°C for about 50 minutes to prepolymerize the two components, and the solvent was removed. A 15 wt.% prepolymer solution was obtained.

The prepolymer solution was treated at a temperature below 50°C under a reduced pressure to prepare a solid adhesive. It was found that the solid adhesive first showed fluidity and then cured when heated to a temperature of more than 175°C.

Example 6

A 30 wt.% solution of 67 mol% of N,N'-methylene-di-p-phenylene bismaleimide in methyl ethyl ketone and a 20wt.% solution of 33 mol% of ethyl α-cyanoacrylate in tetrahydrofuran were mixed together. 4,4'-diaminodiphenylmethane was then added in an amount corresponding to 0.070 equivalent of the diamine for one active double bond to form an adhesive composition solution (Sample 19). Likewise, Samples 20 to 26 were prepared having components in mol% indicated in Table 7, in which the diamine is, however, indicated in the number of equivalent for one active double bond.

These eight composition solutions were heated at 50°C for 30 to 60 minutes while stirred to prepolymerize the two components. The solvent was removed to prepare corresponding 40 to 45 wt.% prepolymer solutions (Samples 19° to 26°).

A. The prepolymer solutions thus obtained were each coated on both surfaces of each Kapton film having a thickness of 0.075 mm. After air-dried, the films were heated at 120° to 140°C for 30 minutes. Adhesive-coated films having 30 to 35g/m² of adhesive on each of them were obtained. From these films, pieces were cut out having a width of 15 mm and a length of 20 mm, and put between two degreased iron plates with a thickness of 1.5 mm, a width of 15 mm and a length of 150 mm. These plates were then pressed at 200°C for 10 hours under a pressure of 3 kg/cm² to make ten tensile shear test pieces for each Sample.

The lap-shear tensile break down load measured at room temperature and at 200°C is shown in Table 7, in which data is given in the average value of five test pieces. Crosshead speed was 2.5 mm/min.

Furthermore, lap-shear tensile break down load was measured after heating, at a temperature indicated in Table 8 for 1000 hours, test pieces obtained using Samples 19', 22' and 24' under the same condition as above. Table 8 shows the percentage of the average of measured values against value at room temperature in Table 7.

Table 8

| Temp. Sample No. | 19 | 22 | 24 |
|---|---|---|---|
| 200°C | 98 | 100 | 99 |
| 225°C | 86 | 88 | 88 |
| 250°C | 70 | 73 | 75 |

B. Lap-shear tensile test pieces of laminated films and of laminated metal plates were prepared using Sample 19' as in Example 1 (B). Lap-shear tensile test was made, obtaining about the same result as in the Example.

C. Adhesive-coated films were prepared each using Samples 19' and 24'. An adhesive-coated film was wound at half lap about a Teflon load having a diameter of 20 mm and a length of 500 mm, about which Teflon tape and shrinkable polyester dielectric tape was further wound. This lod was heated at 200°C for 10 hours and cooled. Polyester tape and Teflon tape were removed and Teflon lod were pulled out, obtaining a tube. Dielectric breakdown voltage was measured, resulting in 7 KV for the tube using Sample 19' and 7.5 KV for the tube using Sample 24'.

Further, these tubes were heat-treated at 200°C for 300 hours, but not appreciable decrease in the breakdown voltage was recognized.

D. To 2 ml of Sample 26 was added as an accelerator 0.05g of tertiary amine indicated below in Table 9. The solution was placed on a plate heated to a temperature indicated in the Table, and gelation time (sec.) was measured. Results are shown in Table 9.

Table 9

| Accelerator | Temperature (°C) 180 | 170 | 160 |
|---|---|---|---|
| Triethylamine | 41 | 58 | 89 |
| Benzyldimethylamine | 26 | 49 | 69 |
| Triethanolamine | 56 | 94 | 128 |
| N,N'-dimethylamine | 35 | 63 | 110 |

Example 7

Eight composition solutions (Samples 27 to 34) hav-

Table 7

| Component \ Sample No. | | 19 | 20 | 21 | 22 | 23 | 24 | 25 | 26 |
|---|---|---|---|---|---|---|---|---|---|
| N,N'-methylene-di-p-phenylene bismaleimide | | 67 | 50 | 50 | 33 | 33 | 25 | 25 | 66 |
| Ethyl α-cyanoacrylate | | 33 | 50 | 50 | 67 | 67 | 75 | 75 | 34 |
| 4,4'-diaminodiphenylmethane | | 0.070 | 0.18 | 0.33 | 0.11 | 0.50 | 0.10 | 0.40 | 0.19 |
| Lap-shear tensile break down load (kg) | Room temp. | 174 | 162 | 160 | 170 | 151 | 175 | 154 | 164 |
| | 200°C | 184 | 176 | 149 | 170 | 126 | 190 | 147 | 186 |

Further, lap-shear tensile test pieces were prepared using adhesive films coated with Samples 19' or 24' under the same condition as above, and their lap-shear tensile break down load was measured at various temperatures. Results are shown in FIG. 2, in which curves (d) and (e) are cases where Samples 19' and 24' were used, respectively.

ing the two components in mol% indicated in Table 10 were prepared and heated to obtain prepolymer solutions as in Example 6. Lap-shear tensile test pieces were prepared from adhesive-coated films applied with these prepolymer solutions, and lap-shear tensile break down load was measured at room temperature and at 200°C. Results are shown also in Table 10.

Table 10

| Component \ Sample No. | | 27 | 28 | 29 | 30 | 31 | 32 | 33 | 34 |
|---|---|---|---|---|---|---|---|---|---|
| N,N'-methylene-di-p-phenylene bis-maleimide | | — | 12.5 | 33 | 50 | 21.5 | 45 | 58 | 35 |
| N,N'-oxy-di-p-phenylene bis-maleimide | | 25 | 25.0 | — | — | 11.5 | — | 8 | 32 |
| N,N'-hexamethylene bismaleimide | | — | — | 11 | — | — | 4.5 | — | — |
| Methyl α-cyano-acrylate | | — | 12.5 | — | 6 | — | 4.5 | — | — |
| Ethyl α-cyano-acrylate | | 75 | 50 | 43.5 | 38 | 67 | 46 | 34 | 22 |
| Isopropyl α-cyano-acrylate | | — | — | 12.5 | 6 | — | — | — | 11 |
| 4,4'-diamino-diphenylmethane | | — | 0.11 | 0.2 | — | 0.16 | 0.11 | 0.09 | 0.2 | 0.09 |
| 4,4'-diamino-diphenyl ether | | — | 0.11 | 0.2 | 0.22 | — | — | 0.09 | — | — |
| Hexamethylene-diamine | | — | — | 0.2 | — | 0.16 | — | — | — | — |
| Lap-shear tensile break down load (kg) | Room temp. | 183 | 173 | 163 | 158 | 170 | 169 | 175 | 177 |
| | 200°C | 203 | 185 | 154 | 145 | 189 | 170 | 192 | 200 |

Further, the prepolymer solution of Sample 31 was applied to a glass cloth 0.025 mm thick. After air-dried, the cloth was heated at 120° to 160°C for about 40 minutes to obtain a prepreg having about 42% by weight of the resin. Lap-shear tensile test piece was prepared from the prepreg, and lap-shear tensile break down load was measured. The load was 172 kg.

What we claim is:

1. A heat-resistant solid adhesive composition consisting essentially of the polymeric reaction product of:
   85 to 1 mol% of at least one N,N'-substituted bismaleimide selected from the group consisting of the bismaleimide represented by the formula

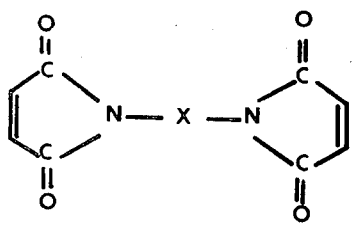

and those represented by the formula

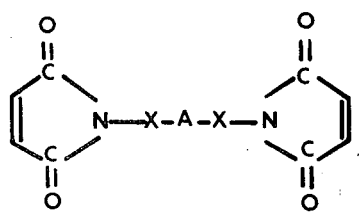

where X is a member selected from the group consisting of alkylene, cycloalkylene and arylene groups, and A is a member selected from the group consisting of oxygen, methylene, carbonyl, sulfonyl, and —CONH—groups; and 15 to 99 mol% of at least one α-cyanoacrylate represented by the formula

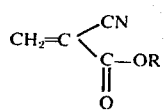

where R is a member selected from the group consisting of $C_1$ to $C_6$ alkyl groups and cyclohexyl group.

2. A heat-resistant adhesive composition according to claim 1, wherein said α-cyanoacrylate is ethyl α-cyanoacrylate.

3. A heat-resistant adhesive composition according to claim 1, wherein the content of said N,N'-substituted bismaleimide is 85 to 25 mol% and that of said α-cyanoacrylate is 15 to 75 mol%.

4. A heat-resistant solid adhesive composition consisting essentially of the polymeric reaction product of:
   85 to 1 mol% of at least one N,N'-substituted bismaleimide represented by the formula

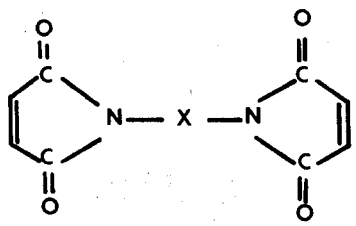

and those represented by the formula

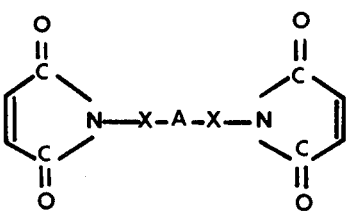

where X is a member selected from the group consisting of alkylene, cycloalkylene and arylene groups, and A is a member selected from the group consisting of oxygen, methylene, carbonyl, sulfonyl and —CONH— groups;

15 to 99 mol% of at least one α-cyanoacrylate represented by the formula

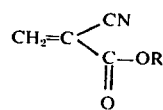

where R is a member selected from the group consisting of $C_1$ to $C_6$ alkyl groups and cyclohexyl group; and
at least one diamine in an amount corresponding to 0.7 to 0.02 equivalent of diamine for one active double bond in the composition, said diamine being selected from the group consisting of the diamines represented by the formula $$NH_2-X-NH_2$$

and those represented by the formula $$NH_2-X-A-X-NH_2$$

where X is a member selected from the group consisting of alkylene, cycloalkylene and arylene groups, and A is a member selected from the group consisting of oxygen, methylene, carbonyl, sulfonyl and —CONH— groups.

5. A heat-resistant adhesive composition according to claim 4 wherein said α-cyanoacrylate is ethyl α-cyanoacrylate.

6. A heat-resistant adhesive composition according to claim 4, wherein the content of said N,N'-substituted bismaleimide is 85 to 25 mol% and that of said α-cyanoacrylate is 15 to 75 mol%.

7. A heat-resistant adhesive composition according to claim 1 diluted with an inert solvent of relatively low boiling point.

* * * * *